United States Patent
Hinze et al.

(10) Patent No.: US 10,439,523 B2
(45) Date of Patent: Oct. 8, 2019

(54) METHOD AND DEVICE FOR CONTROLLING AN OPERATION OF AN ELECTRIC MOTOR

(71) Applicant: CONTI TEMIC MICROELECTRONIC GMBH, Nuremberg (DE)

(72) Inventors: Patrick Hinze, Winkelhaid (DE); Andreas Schnell, Kammerstein (DE); Andreas Schulze, Lauf A. D. Peg. / OT Neunhof (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/316,191

(22) PCT Filed: May 28, 2015

(86) PCT No.: PCT/EP2015/061854
§ 371 (c)(1),
(2) Date: Dec. 5, 2016

(87) PCT Pub. No.: WO2015/185439
PCT Pub. Date: Dec. 10, 2015

(65) Prior Publication Data
US 2017/0324356 A1 Nov. 9, 2017

(30) Foreign Application Priority Data
Jun. 6, 2014 (DE) .................. 10 2014 210 885

(51) Int. Cl.
*H02P 6/15* (2016.01)
*H02P 21/00* (2016.01)

(52) U.S. Cl.
CPC .......... *H02P 6/153* (2016.02); *H02P 21/0089* (2013.01)

(58) Field of Classification Search
None
See application file for complete search history.

(56) References Cited

U.S. PATENT DOCUMENTS 5,200,675 A   4/1993  Woo
5,677,605 A * 10/1997  Cambier ................. H02P 6/181
                                                318/400.02

(Continued)

FOREIGN PATENT DOCUMENTS

CN   1728542 A   2/2006
DE   4136538 A1  5/1992

(Continued)

*Primary Examiner* — Eduardo Colon Santana
*Assistant Examiner* — Said Bouziane
(74) *Attorney, Agent, or Firm* — Laurence A. Greenberg; Werner H. Stemer; Ralph E. Locher

(57) ABSTRACT

In a method for controlling an operation of an electric motor, electric voltages applied to electric phases of the electric motor are generated and output in a modulation in a controlled manner dependent on a rotor position of the electric motor and a target/actual comparison of at least one first variable which characterizes a load on the electric motor or an actual rotational speed of the electric motor. A rotor position angle, which characterizes the rotor position, is complemented with a specified preliminary control angle and another regulated preliminary control angle component upon reaching a field weakening range of the electric motor so as to form a sum angle. The sum angle is used to characterize the rotor position in the modulation upon reaching the field weakening range. The disclosure also relates to a device for controlling an operation of an electric motor.

12 Claims, 5 Drawing Sheets

(56) References Cited

U.S. PATENT DOCUMENTS

| | | | |
|---|---|---|---|
| 6,329,781 B1 | 12/2001 | Matsui et al. | |
| 6,972,534 B1 | 12/2005 | Schulz et al. | |
| 8,866,423 B2* | 10/2014 | Suel, II | H02P 23/009 |
| | | | 318/163 |
| 9,425,722 B2 | 8/2016 | Shouji | |
| 2008/0265809 A1 | 10/2008 | Ol et al. | |
| 2009/0322264 A1* | 12/2009 | Imura | B60L 15/025 |
| | | | 318/400.09 |
| 2011/0130996 A1 | 6/2011 | Blind et al. | |
| 2013/0187582 A1 | 7/2013 | Nishimura et al. | |
| 2014/0300299 A1 | 10/2014 | Heise et al. | |

FOREIGN PATENT DOCUMENTS

| | | |
|---|---|---|
| DE | 4233804 A1 | 4/1994 |
| DE | 102005041621 A1 | 3/2006 |
| DE | 102008020786 A1 | 11/2008 |
| DE | 102008001408 A1 | 10/2009 |
| DE | 102010001427 A1 | 8/2011 |
| DE | 102011080941 A1 | 2/2013 |
| DE | 102011089547 A1 | 6/2013 |
| DE | 112011102997 T5 | 8/2013 |
| DE | 102012213386 A1 | 2/2014 |
| EP | 1753123 A2 | 2/2007 |
| JP | 2000228892 A | 8/2000 |
| JP | 2003209999 A | 7/2003 |
| JP | 2008290664 A | 12/2008 |
| JP | 2013192399 A | 9/2013 |
| WO | 9407301 A1 | 3/1994 |
| WO | WO2011092320 A2 | 8/2011 |
| WO | 2013092398 A2 | 6/2013 |

* cited by examiner

METHOD AND DEVICE FOR CONTROLLING AN OPERATION OF AN ELECTRIC MOTOR

BACKGROUND OF THE INVENTION

Field of the Invention

The invention relates to a method for controlling an operation of an electric motor, in particular in the surroundings or in an application for a vehicle transmission, wherein in a modulation electric voltages which are applied to electric phases of the electric motor are generated and output in a controlled fashion as a function of a rotor position of the electric motor and as a function of a setpoint/actual comparison of at least one first variable which characterizes a load of the electric motor or of an actual rotational speed of the electric motor.

The invention also relates to a device for controlling an operation of an electric motor, comprising a supply unit for the controlled outputting of electric voltages at electric phases of the electric motor, wherein the supply unit is coupled to at least one detection unit for detecting a rotor position of the electric motor and to at least one regulator for carrying out a setpoint/actual comparison of a first variable which characterizes a load of the electric motor.

Electromechanically or hydraulically activated vehicle transmissions comprise one or more electric motors for pump drives or direct drives, wherein selector devices or gear shift devices and clutch devices and brake devices of the vehicle transmission are actuated by means of the at least one electric motor.

Various methods for controlling such electric motors for vehicle transmissions are known from the prior art. A supply of current to individual motor windings of the electric motors is controlled, in particular, for reasons of cost, by means of what is referred to as block commutation and what is referred to as a B6 bridge circuit. In this context, what is referred to as a high-side switch of a half bridge of the bridge circuit and what is referred to as a low-side switch of the half bridge are connected within a commutation step.

The commutation step is controlled as a function of a rotor position of the electric motor, wherein Hall sensors are provided, for example in the electric motor, for the purpose of determining the rotor position. The Hall sensors are arranged in such a way that an electrical angular resolution of 60° is implemented by means of the high-low logic levels.

In order to increase this angular resolution, it is known to use high-resolution angle sensors. The voltages which are output to the electric phases of the electric motor can therefore be adapted better to a respective rotor position. So-called sine commutation which is implemented in this way permits a greater degree of utilization of the efficiency level of the electric motor with simultaneously quiet running of the motor. In this context, the electric voltage is generated by means of a space vector modulation as a function of information about a rotor angle, in such a way that said modulation is sinusoidal.

In order to increase further the efficiency level of the electric motor during sinusoidal commutation it is known that a maximum current level in the motor windings for positioning magnets of the rotor is synchronized in such a way that a fixed offset of 90° is produced. For this purpose, what is referred to as field-oriented regulation is used in which phase currents of the electric motor are used in conjunction with the information about the rotor position to regulate the phase voltages which are output.

It is also known that in what is referred to as the armature actuation range of an electric machine either a rotational speed regulator or a power regulator regulate a degree of modulation, that is to say the amplitude of the voltage vector which is to be output. The actual commutation of the motor by means of the B6 bridge circuit is carried out after the evaluation of the rotor position angle. A commutation angle for the modulation is formed as a function of the rotor position, and the corresponding electric phases of the electric motor are then energized. In order to be able to operate an electric motor for even higher rotational speeds also in what is referred to as the field attenuation mode, it is necessary to modify the motor voltage which is output.

This is implemented in the field-oriented regulation by additional regulation of a field-weakening current component.

BRIEF SUMMARY OF THE INVENTION

The invention is based on the object of specifying a method which is improved compared to the prior art and an improved device for controlling an operation of an electric motor, in particular for a vehicle transmission.

With respect to the method, the object is achieved according to the invention by means of the features of the method claims, and with respect to the device by means of the features of the device claims.

Advantageous refinements of the invention are the subject matter of the dependent claims.

In a method for controlling an operation of an electric motor, in particular in the surroundings or in an application for a vehicle transmission, in a modulation electric voltages which are applied to electric phases of the electric motor are generated and output in a controlled fashion as a function of a rotor position of the electric motor and as a function of a setpoint/actual comparison of at least one first variable, which characterizes a load of the electric motor, or of an actual rotational speed of the electric motor.

According to the invention, when, in particular, a field-weakening range of the electric motor is reached, a predefined pilot-control angle and a further regulated pilot-control angle component are added to a rotor position angle, which characterizes the rotor position, to form a composite angle, wherein when the field-weakening range is reached, the composite angle is used to characterize the rotor position in the modulation.

Therefore, an actuation method of an electric motor which is arranged, in particular, in the surroundings of a vehicle transmission is implemented which makes it possible, in particular in the field-weakening range of the electric motor, to adapt working points of said motor according to demand and optimized in terms of efficiency, in particular in the case of low supply voltages. For this purpose, in contrast with known motor actuation methods, only one additional subordinate regulator is necessary, which, in particular after an adjustment limit of a maximum motor voltage has been reached, provides optimum orientation of an output voltage vector in terms of its position with respect to the rotor field. Therefore, compared to field-oriented regulating means known from the prior art, a simple and cost-effective method is made available, wherein no phase-current-measuring components which are costly in terms of installation space and financial expenditure are required. This means that in comparison with a field-oriented regulating means, an operation of the electric motor with a maximum possible efficiency level while taking into account the regulating capability, even without cost-intensive phase current back-measurement can always be implemented.

Furthermore, a particularly large rotational speed torque range of the electric motor can be covered by means of the method according to the invention, and in particular a maximized efficiency level of the electric motor can be achieved even in the partial load operation thereof in the field-weakening range. In this context, the method brings about independence of a supply voltage of a supply unit for the controlled outputting of the electric voltages to the electric phases of the electric motor and permits an increased level of robustness with respect to component tolerance of the electric motor and the changes thereof during its service life by regulation.

Early commutation, optimized with the method according to the invention and appropriate for the demand, of the electric motor permits the electric motor to continue to be operated with a high level of efficiency even in the field-weakening mode. In this context as much additional pilot-control angle is applied as is necessary to reach the required operating point given an available supply voltage. This permits actuation with the maximum possible torque per ampere of current intensity without the need for an inefficient bias, for example with respect to supply voltage fluctuations.

The method according to the invention connects rapid characteristic diagram guidance with regulation which is implemented at the working point according to requirements.

In one possible refinement of the method, the reaching of the field-weakening range is detected when an upper limit of a degree of modulation which characterizes a predefined maximum amplitude of a motor voltage and/or a motor current is reached. As a result, the field-weakening range can be detected particularly easily and reliably.

In order to improve further the operation of the electric motor in the field-weakening range, in one further possible refinement of the method, when the field-weakening range is reached, the degree of modulation is defined at its upper limit, as it were "frozen" and the modulation of the electric voltages is preferably carried out solely by regulating the pilot-control angle.

One possible development of the method provides that the pilot-control angle is determined as a function of an actual rotational speed and of at least one second variable, which characterizes a load of the electric motor, from a pilot-control angle characteristic diagram. The method which is controlled by means of characteristic diagram in this way requires, owing to the control of the operation of the electric motor while using the pilot-control angle characteristic diagram, only a small amount of expenditure on data processing and as a result a small amount of expenditure on software. Therefore, only a low level of computational power is necessary to implement the method, and as a result a low deployment of resources.

According to one refinement of the method, the pilot-control angle is predefined, in particular, exclusively for an armature actuation range of the electric motor, wherein as a result the advantage of rapid control is combined with the property of a regulator of eliminating persistent deviations.

In order to implement a limitation of the limitation of the pilot-control angle, in a further possible refinement of the method a maximum value of the pilot-control angle is predefined.

In order always to implement optimized regulation of the rotational speed of the electric motor, the pilot-control angle is, in particular, predefined in such a way that a regulation reserve is generated during the modulation for the voltage as a manipulated variable.

One possible refinement of the method provides that a rotational speed, a torque and/or a motor current are used as a first variable which characterizes the load of the electric motor. These variables represent the load of the electric motor particularly accurately.

According to one development of the method, a currently requested motor voltage, a current direct current, a phase current which is determined from the direct current and a pulse duty factor, a measured phase current and/or a torque are used as a second variable which characterizes the load of the electric motor. These variables represent the load of the electric motor particularly accurately. In particular, when the motor voltage is used as an input variable for the pilot-control angle characteristic diagram the disadvantage of a fluctuating supply voltage is overcome, since the fluctuation in the case of possible conversion of the required motor voltage into a degree of modulation or duty cycle is compensated over the available intermediate circuit voltage.

In one possible refinement of the method, the pilot-control angle characteristic diagram is generated by determining pilot-control angles at rotational speed operating points and torque operating points of the electric motor at which at least the efficiency level of the electric motor is maximized. Therefore, when the pilot-control angle characteristic diagram is used, an optimum operating point of the electric motor with an optimum efficiency level can always be set.

In a possible further refinement of the method, the voltages are determined as a function of the composite angle in a space vector modulation. A very high angular resolution of the voltage vector which is output, i.e. discretization of the output voltages of block voltages to the sinusoidal shape, can be implemented by means of the space vector modulation, and very quiet running of the motor can be implemented with high utilization of the efficiency level.

The device for controlling an operation of an electric motor comprises a supply unit for the controlled outputting of electric voltages at electric phases of the electric motor, wherein the supply unit is coupled to at least one detection unit for detecting a rotor position of the electric motor, and to at least one regulator for carrying out a setpoint/actual comparison of a first variable which characterizes a load of the electric motor.

According to the invention, a memory is provided in which a pilot-control angle characteristic diagram is stored, a control unit is provided for determining a pilot-control angle from the pilot-control angle characteristic diagram, in order to add a pilot-control angle and a further regulated pilot-control angle component to a rotor position angle, which characterizes the rotor position, to form a composite angle, for determining the phase voltages of the electric motor as a function of the composite angle when a field-weakening range of the electric motor is reached, and for controlling the outputting of the electric voltages to the electric phases of the electric motor by means of the supply unit.

The device according to the invention is distinguished in that, when the field-weakening range is reached operation of the electric motor is controlled using the pilot-control angle by means of a particularly simple and cost-effective structure with a particularly low requirement for computing capacity. The device is also embodied in a simple and cost-effective way without phase-current-measuring components which are costly in terms of installation space and financial outlay compared to field-oriented regulating means known from the prior art.

In one possible refinement, the regulator is a rotational speed regulator, a torque regulator or a power regulator which are embodied in a simple, cost-effective and reliable way.

In a further possible refinement of the device, the supply unit comprises a bridge circuit, for example a B6 bridge circuit by means of which block commutation of the electric motor can be implemented in a very simple and reliable way.

Exemplary embodiments of the invention are explained in more detail below with reference to drawings, of which:

DESCRIPTION OF THE INVENTION

Corresponding parts are provided with the same reference symbols in all the figures.

Figure 1:
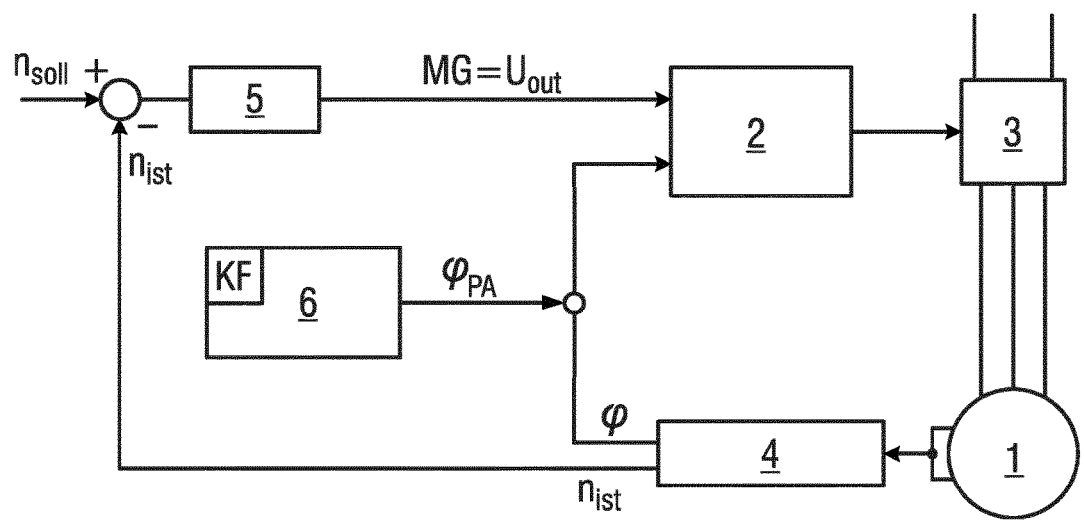
FIG. 1 shows a schematic block diagram of a first exemplary embodiment of a control loop for the controlled sinusoidal actuation of an electric motor with field-weakening regulation according to the invention.

FIG. 1 shows a block diagram of a first exemplary embodiment of a control loop for the controlled block actuation or sinusoidal actuation of an electric motor 1 with field-weakening regulation of the electric motor 1.

In this context, a supply of power to individual motor windings of the electric motor 1 is controlled within the scope of a block or sinusoidal commutation by means of a control unit 2 by controlling a B6 bridge 3. Here, a high-side switch of a half bridge of the B6 bridge 3 and a low-side switch of the half bridge are connected (in a way not illustrated in more detail) within a commutation step for pulse width modulation. The commutation step is controlled here as a function of a rotor position of the electric motor 1.

In a detection unit 4, an actual rotational speed $n_{act}$ of the electric motor 1 is also determined and fed back, wherein an output voltage $U_{out}$ is set as a function of a setpoint rotational speed $n_{setp}$ of the electric motor 1 as the degree of modulation MG by means of a regulator 5 which is embodied as a rotational speed regulator, as a function of which output voltage $U_{out}$ the control unit 2 controls the B6 bridge 3.

In addition, the composite angle $\varphi_\Sigma$ is generated as a function of the actual rotational speed $n_{act}$ and of the variable G, which represents the load of the electric motor 1, on the basis of the pilot-control angle characteristic diagram KF and the rotor position angle $\varphi$, and is fed to the control unit 2 for space vector modulation RZM, which control unit 2 generates an actuation signal for the B6 bridge 3 on the basis of an amplitude of the voltage vector and an optimized commutation angle.

That is to say, in a simple motor actuation without phase current back-measurement, the electric voltages which are output to the electric motor 1 are modulated by means of the information of the rotor position and the predefined degree of modulation MG from the regulator 5 which is embodied as a rotational speed regulator. If, with this type of actuation, an armature actuation range of the electric motor 1 is exited in the direction of field weakening, that is to say a field-weakening range of the electric motor 1 is reached when an upper limit is reached by a predefined maximum amplitude of the output voltage $U_{out}$ and/or a motor current with or without regulating reserve, an additional pilot-control angle $\varphi_{PA}$ is generated starting from a pilot-control angle characteristic diagram KF for the commutation, by means of a subordinate pilot-control angle regulator 6. In this context, achieving a regulating reserve in the degree of modulation MG by optimizing the pilot-control angle $\varphi_{PA}$ is the main component, alongside the possibility of utilizing field weakening of the electric motor 1. A maximum permissible value of the pilot-control angle $\varphi_{PA}$ is provided in a limited fashion here preferably by means of an adjustable limit.

The pilot-control angle characteristic diagram KF is determined, in particular, in a data supply procedure of the entire system by determining pilot-control angles $\varphi_{PA}$ at rotational speed operating points and torque operating points of the electric motor 1 at which at least the efficiency level of the electric motor 1 is maximized, in particular a complete level of efficiency of electric motor 1 and the actuation electronics thereof. The pilot-control angle characteristic diagram KF is stored, in particular, in a memory (not illustrated) of the pilot-control angle regulator 6.

In the illustrated exemplary embodiment, the value of the pilot-control angle $\varphi_{PA}$ which is applied to the output of the pilot-control angle regulator 6 is added to the determined rotor position angle $\varphi$ of the electric motor 1 to form a composite angle $\varphi_\Sigma$, in particular added before the composite angle $\varphi_\Sigma$ is passed on for use for the modulation of the voltages for the electric motor 1.

In contrast to the illustration, the method according to the invention, the device according to the invention and the refinements thereof can also be used (in a manner not shown) in regulating structures with a subordinate power regulator or other regulating structures, for example for direct torque regulation, and is not restricted to the structure illustrated with rotational speed regulation.

Figure 2:
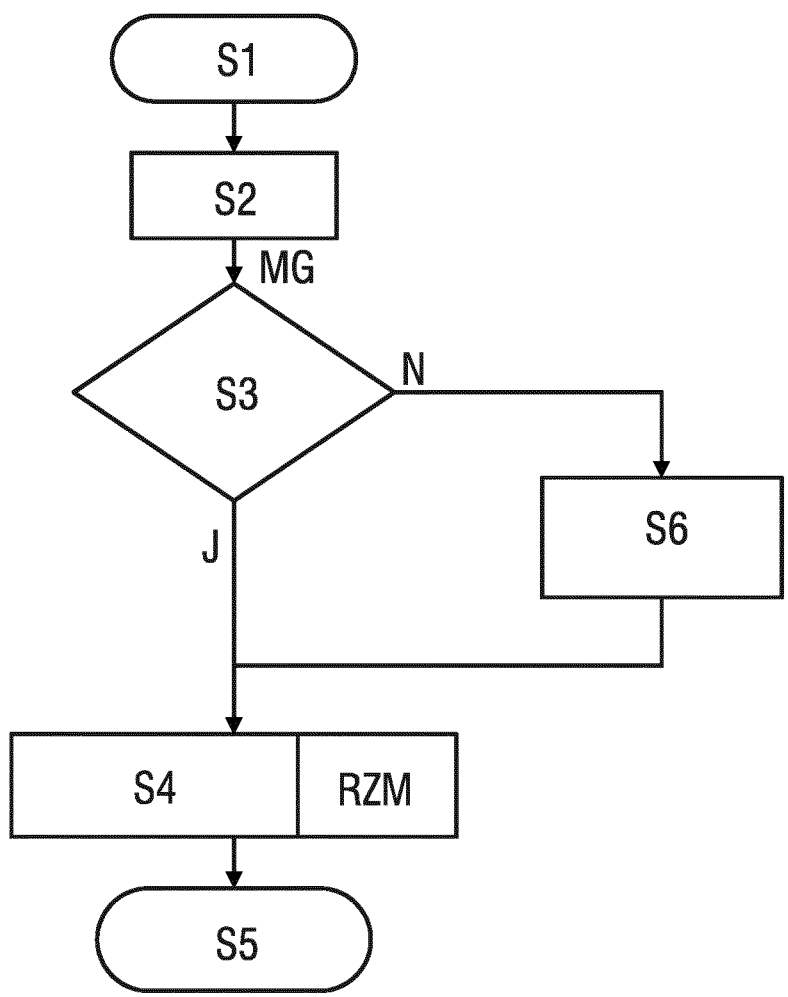
FIG. 2 shows a schematic flowchart of a first exemplary embodiment of a method according to the invention for controlling an operation of an electric motor with field-weakening regulation.

FIG. 2 shows a flowchart of a possible first exemplary embodiment of a method according to the invention for controlling the operation of the electric motor 1 with field-weakening regulation.

In this context, in a first method step S1 the setpoint rotational speed $n_{setp}$ or, in a way which is not illustrated in more detail, a setpoint current or a setpoint torque is fed to the regulator 5 which is correspondingly embodied as a rotational speed regulator, power regulator or torque regulator and generates the output voltage $U_{out}$ in a second method step S2 as a function of the actual rotational speed $n_{act}$, detected by means of the detection unit 4, of the actual current or of the actual torque.

In a third method step S3, for an armature actuation range of the electric motor 1 it is determined whether the degree of modulation MG is between the value "zero" and a predefined maximum value which characterizes the transition to the field-weakening range.

If this is the case (characterized by the reference symbol Y) the voltages are determined in a fourth method step S4 in a space vector modulation RZM as a function of the rotor position angle φ as a voltage vector, and in a fifth method step S5 they are output to the electric phases of the electric motor 1 in a controlled fashion.

If the degree of modulation MG exceeds the maximum value (characterized by the reference symbol N) which characterizes the transition to the field-weakening range, the rotor position angle φ is added to a pilot-control angle $\varphi_{PA}$, additionally determined in a sixth method step S6 by means of the pilot-control angle regulator 6, to form the composite angle $\varphi_\Sigma$. The voltages are determined as voltage vectors in the space vector modulation RZM as a function of the composite angle $\varphi_\Sigma$, and are output in a controlled fashion to the electric phases of the electric motor 1.

Figure 3:
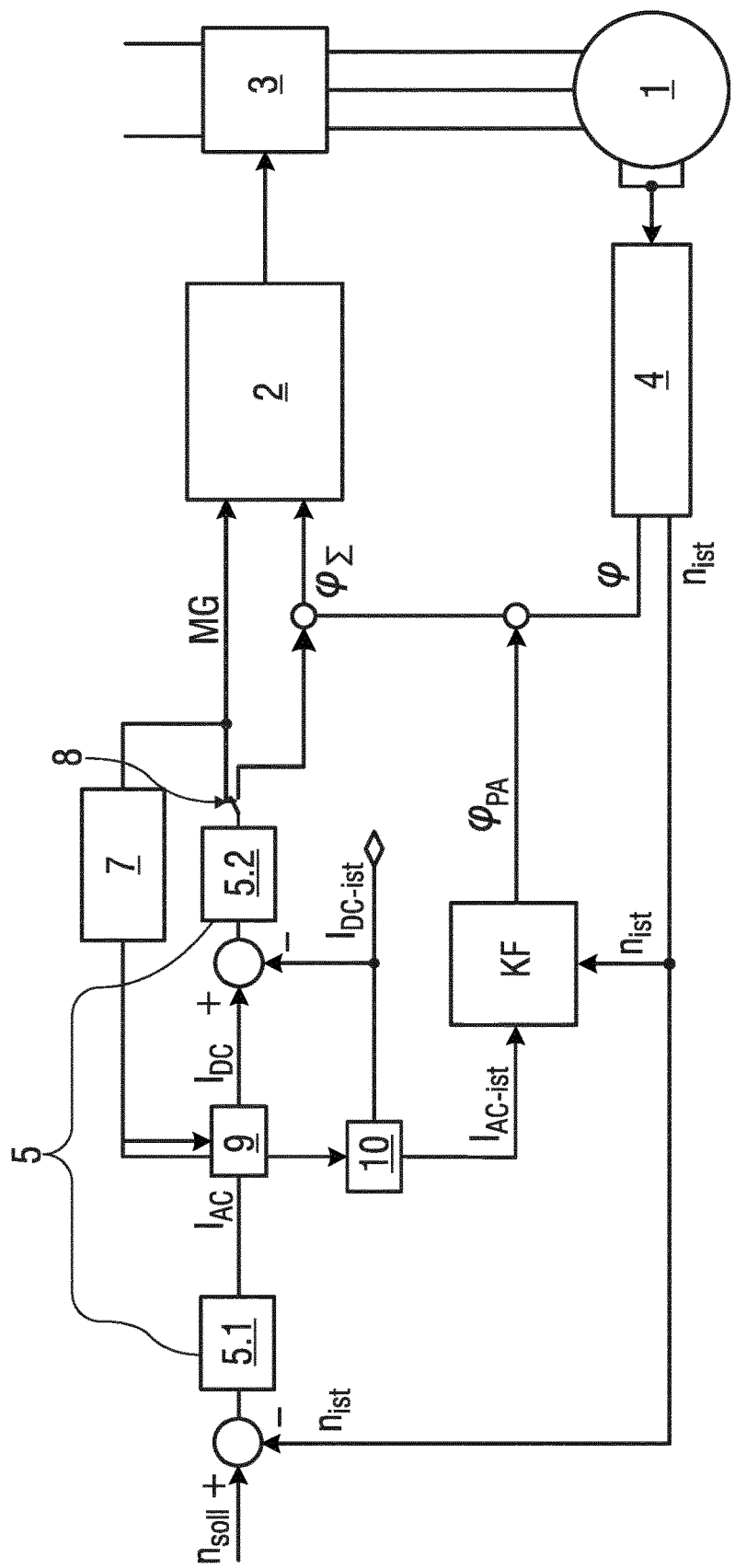
FIG. 3 shows a schematic block diagram of a second exemplary embodiment of a control loop for the controlled sinusoidal actuation of an electric motor with field-weakening regulation according to the invention.

FIG. 3 shows a block diagram of a second exemplary embodiment of a control loop for the controlled sinusoidal actuation of the electric motor 1 with field-weakening regulation according to the invention.

In this context, the control loop is embodied in such a way that in the case of the regulator output variable of the regulator 5 embodied as a rotational speed regulator 5.1 and a power regulator 5.2 it is possible to switch over situationally between the degree of modulation MG and the additive commutation angle, that is to say the composite angle $\varphi_\Sigma$ which is formed from the rotor position angle φ and the pilot-control angle $\varphi_{PA}$. At the same time, the regulator parameters are adapted to the respective state.

In this context, when the upper limit of the degree of modulation MG is reached, the degree of modulation MG is defined, as it were "frozen", at its upper limit, and the modulation of the electric voltages is carried out solely by regulating the pilot-control angle $\varphi_{PA}$. Therefore, a further regulating difference between the rotational speed regulator 5.1 and the power regulator 5.2, which would bring about an increase in the regulator manipulated variable, is no longer added to the degree of modulation MG but is instead added as a pilot-control angle $\varphi_{PA}$ to the actual rotor position angle φ.

For this purpose, an alternating current $I_{AC}$ as regulator output variable of the rotational speed regulator 5.1 is fed, together with the degree of modulation MG fed via a signal conditioner 7 as a regulator output variable of the power regulator 5.2, to a multiplier 9 which generates a setpoint direct current $I_{CC}$ as a regulator input variable for the power regulator 5.2, as a function of said setpoint direct current $I_{DC}$ and an actual direct current $I_{DC\_act}$ the output of the power regulator 5.2 is connected to a switching means 8 in the actuation algorithm.

Furthermore, the pilot-control angle $\varphi_{PA}$ is determined on the basis of the determined actual rotational speed $n_{act}$ and an actual alternating current $I_{AC\text{-}act}$, which characterizes the load of the electric motor 1 and is generated by means of a divider 10, and said pilot-control angle $\varphi_{PA}$ is added with the rotor position angle φ to form the composite angle $\varphi_\Sigma$.

That is to say the regulator output of the power regulator 5.2 is switched over situationally between the degree of modulation MG and the pilot-control angle $\varphi_{PA}$. The pilot-control angle $\varphi_{PA}$ from a pilot-control angle characteristic diagram KF which supplies only a minimum and operational-point-optimized pilot-control angle $\varphi_{PA\_min}$ for the armature actuation range, serves as the starting point for use as a pilot-control angle $\varphi_{PA}$. This combines the advantage of rapid control with the property of a regulator 5 to eliminate persistent deviations.

Figure 4:
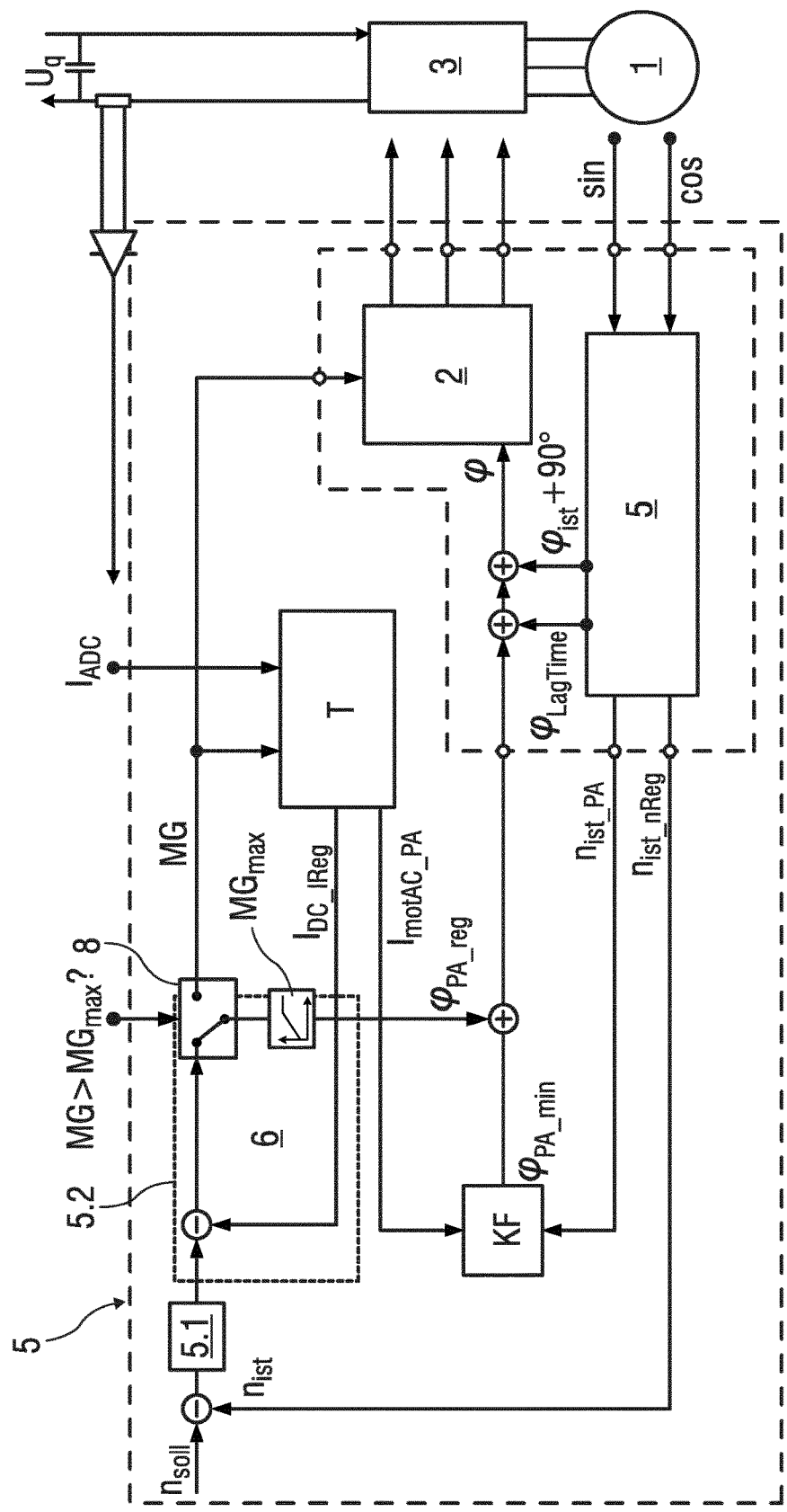
FIG. 4 shows a schematic, detailed block diagram of the second exemplary embodiment of the control loop according to FIG. 3.

This is illustrated in FIG. 4 in a detailed block diagram of the second exemplary embodiment of the control loop according to FIG. 3.

In this context, an actual rotational speed $n_{act\_PA}$ for the pilot-control angle characteristic diagram KF and an actual rotational speed $n_{act\_nReg}$ for the rotational speed regulator 5.1 as well as an actual rotor position angle $\varphi_{act}$ and a lag time rotor position angle $\varphi_{LagTime}$ are determined in a filtering operation and an angle- and rotational speed-calculating operation by means of the detection unit 5 from the sine values sin and cosine values cos of a rotational angle sensor which detects the position of the rotor of the electric motor 1.

Furthermore, in a process of triggering T values of an analog/digital converter from a current value $I_{ADC}$ and the degree of modulation MG an actual direct current $I_{DC\_IReg}$ is determined for feeding back for the power regulator 5.2, and an actual alternating current $I_{motAC\_PA}$ is determined for feeding back for the pilot-control angle characteristic diagram KF, wherein the switch 8 is switched as a function of exceeding of the maximum value $MG_{max}$ of the degree of modulation MG whether the setting of the voltages takes place solely on the basis of the pilot-control angle $\varphi_{PA}$ or on the basis of the composite angle $\varphi_\Sigma$.

Figure 5:
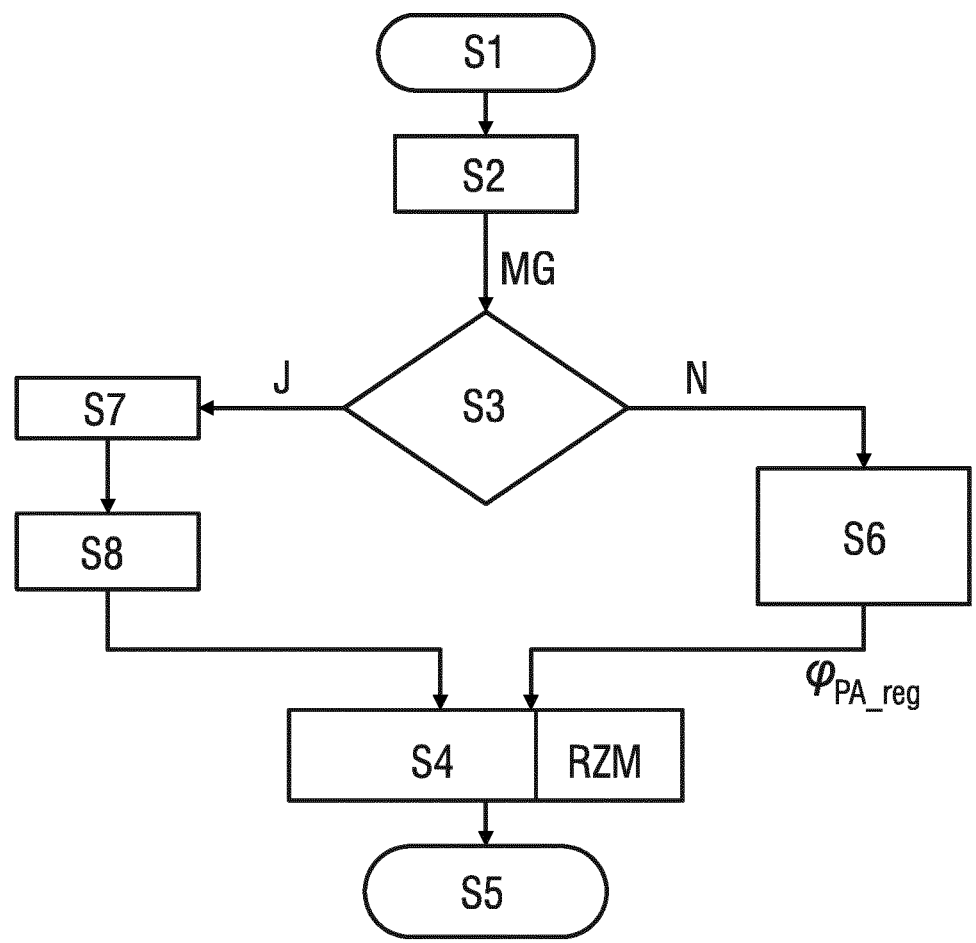
FIG. 5 shows a schematic flowchart of a second exemplary embodiment of a method according to the invention for controlling an operation of an electric motor with field-weakening regulation.

FIG. 5 shows a flowchart of a possible second exemplary embodiment of a method according to the invention for controlling the operation of the electric motor 1 with field-weakening regulation.

In this context, in contrast to the exemplary embodiment illustrated in FIG. 2, when the predefined maximum value $MG_{max}$ of the degree of modulation MG is undershot the load of the electric motor 1 is determined on the basis of a second variable, characterizing said load in a seventh method step S7, and the pilot-control angle $\varphi_{PA}$ is determined in an eighth method step S8, from the pilot-control angle characteristic diagram KF, and is fed to the space vector modulation RZM in the fourth method step S4. In particular, a currently requested motor voltage, a current direct current, a phase current which is determined from the direct current and a duty cycle factor, a measured phase current and/or a torque are used as the second variable.

When the predefined maximum value of the degree of modulation MG is exceeded, in a sixth method step S6 an additional pilot-control angle component $\varphi_{PA\_reg}$ is formed from the regulator manipulated variable and added to the pilot-control angle $\varphi_{PA}$ and the rotor position angle φ to form the composite angle $\varphi_\Sigma$ which is fed to the space vector modulation RZM in the fourth method step S4.

LIST OF REFERENCE SYMBOLS

1 Electric motor
2 Control unit
3 B6 bridge
4 Detection unit
5 Regulator
5.1 Rotational speed regulator
5.2 Power regulator
6 Pilot-control angle regulator
7 Signal conditioner
8 Switch
9 Multiplier
10 Divider
cos Cosine value
$I_{AC}$ Alternating current
$I_{AC\_act}$ Actual alternating current
$I_{ADC}$ Current value $I_{DC}$ Setpoint direct current
$I_{DC\_act}$ Actual direct current
$I_{DC\text{-}IReg}$ Actual direct current
$I_{motAC\_PA}$ Actual alternating current
Y Yes
KF Pilot-control angle characteristic diagram
MG Degree of modulation
$MG_{max}$ Maximum value
N No
$n_{act}$ Actual rotational speed
$n_{act\_nReg}$ Actual rotational speed
$n_{act\_PA}$ Actual rotational speed
$n_{setp}$ Setpoint rotational speed
RZM Space vector modulation
S1 to S8 Method step
sin Sine value
T Triggering operation
$U_{out}$ Output voltage
φ Rotor position angle
$φ_{act}$ Actual rotor position angle
$φ_{LagTime}$ rotor position angle
$φ_{PA}$ Pilot-control angle
$φ_{PA\_min}$ Pilot-control angle
$φ_{PA\_reg}$ Pilot-control angle component
$φ_Σ$ Composite angle

The invention claimed is:

1. A method for controlling an operation of an electric motor, the method comprising:
in a modulation, generating electric voltages which are applied to electric phases of the electric motor and outputting the electric voltages in a controlled fashion as a function of a rotor position of the electric motor and as a function of a setpoint/actual comparison of at least one first variable that characterizes a load of the electric motor or of an actual rotational speed of the electric motor;
determining that a field-weakening range of the electric motor has been reached when an upper limit of a degree of modulation which characterizes a predefined maximum amplitude of a motor voltage and/or a motor current is reached;
in response to determining that the field-weakening range of the electric motor is reached, adding a predefined pilot-control angle and a further regulated pilot-control angle component to a rotor position angle, which characterizes a rotor position, to form a composite angle;
in response to determining that the field-weakening range is reached, using the composite angle to characterize the rotor position in the modulation;
determining the pilot-control angle as a function of an actual rotational speed and of at least one second variable, which characterizes a load of the electric motor, from a pilot-control angle characteristic diagram, and adding the further regulated pilot-control angle component to the pilot-control angle;
using at least one of a currently requested motor voltage, a current direct current, a phase current which is determined from the direct current and a pulse duty factor, a measured phase current and/or a torque as the at least one second variable that characterizes the load of the electric motor; and
when the field-weakening range is reached, defining the degree of modulation at its upper limit, and carrying out the modulation of the electric voltages by regulating the pilot-control angle.

2. The method according to claim 1, wherein the pilot-control angle is predefined for an armature actuation range of the electric motor.

3. The method according to claim 1, wherein a maximum value of the pilot-control angle is predefined.

4. The method according to claim 3, wherein the pilot-control angle is predefined such that a regulation reserve is generated during the modulation for a voltage as a manipulated variable.

5. The method according to claim 1, which comprises using at least one of a rotational speed, a torque, and/or a motor current as the first variable the characterizes the load of the electric motor.

6. The method according to claim 1, which comprises generating the pilot-control angle characteristic diagram by determining pilot-control angles at rotational speed operating points and torque operating points of the electric motor at which at least one efficiency level of the electric motor is maximized.

7. The method according to claim 1, which comprises determining the voltages as a function of the composite angle in a space vector modulation.

8. A device for controlling an operation of an electric motor, the device comprising:
a supply unit for a controlled outputting of electric voltages at electric phases of the electric motor;
at least one detection unit coupled to said supply unit and configured for detecting a rotor position of the electric motor;
at least one closed-loop controller for carrying out a setpoint/actual comparison of a first variable that characterizes a load of the electric motor;
a memory having stored therein a pilot-control angle characteristic diagram;
a control unit connected to said memory and configured for determining a pilot-control angle from the pilot-control angle characteristic diagram, in order to add a pilot-control angle and a further regulated pilot-control angle component to a rotor position angle, which characterizes the rotor position, to form a composite angle, for determining the voltages as a function of the composite angle when a field-weakening range of the electric motor is reached, and for controlling the outputting of the electric voltages to the electric phases of the electric motor by said supply unit;
said control unit configured for determining the pilot-control angle as a function of an actual rotational speed and of at least one second variable, which characterizes a load of the electric motor, from a pilot-control angle characteristic diagram;
said control unit configured for determining that the field-weakening range of the electric motor has been reached when an upper limit of a degree of modulation which characterizes a predefined maximum amplitude of a motor voltage and/or a motor current is reached;
said control unit configured for using at least one of a currently requested motor voltage, a current direct current, a phase current which is determined from the direct current and a pulse duty factor, a measured phase current and/or a torque as the at least one second variable that characterizes the load of the electric motor; and
said control unit configured for, when the field-weakening range is reached, defining the degree of modulation at its upper limit, and carrying out the modulation of the electric voltages by regulating the pilot-control angle.

9. The device according to claim 8, wherein said closed-loop controller is a rotational speed controller, a torque controller or a power controller or comprises the power controller.

10. The device according to claim 8, wherein said closed-loop controller includes a rotational speed controller, a torque controller or a power controller.

11. The device according to claim 8, wherein said supply unit comprises a bridge circuit.

12. The device according to claim 11, wherein said bridge circuit is a B6 bridge circuit.

* * * * *